No. 866,184. PATENTED SEPT. 17, 1907.
C. P. BRISON.
DEVICE FOR FASTENING PULLEYS.
APPLICATION FILED MAR. 10, 1906.

WITNESSES:

INVENTOR
C. P. Brison.
BY
ATTORNEYS

UNITED STATES PATENT OFFICE.

CHARLES PHILIP BRISON, OF NEW ALBANY, INDIANA.

DEVICE FOR FASTENING PULLEYS.

No. 866,184.　　　　Specification of Letters Patent.　　　　Patented Sept. 17, 1907

Application filed March 10, 1906. Serial No. 305,342.

*To all whom it may concern:*

Be it known that I, CHARLES PHILIP BRISON, a citizen of the United States, residing at New Albany, in the county of Floyd and State of Indiana, have invented a new and useful Improvement in Devices for Fastening Pulleys, of which the following is a specification.

This invention relates to set screws and more particularly to those used in fastening pulleys and wheels to shafts, the object being to provide the pulley or wheel with a threaded plug in which the set screws are secured so that they can be easily and quickly removed when broken and be replaced with a new one.

Another object of my invention is to provide the hub of the wheel or pulley with a threaded opening adapted to receive the threaded plug which is provided with a threaded bore, through which the lower end of the set screw is adapted to pass and engage the shaft.

With these objects in view, the invention consists of certain details of construction, hereinafter fully described and pointed out in the claims.

Figure 1:
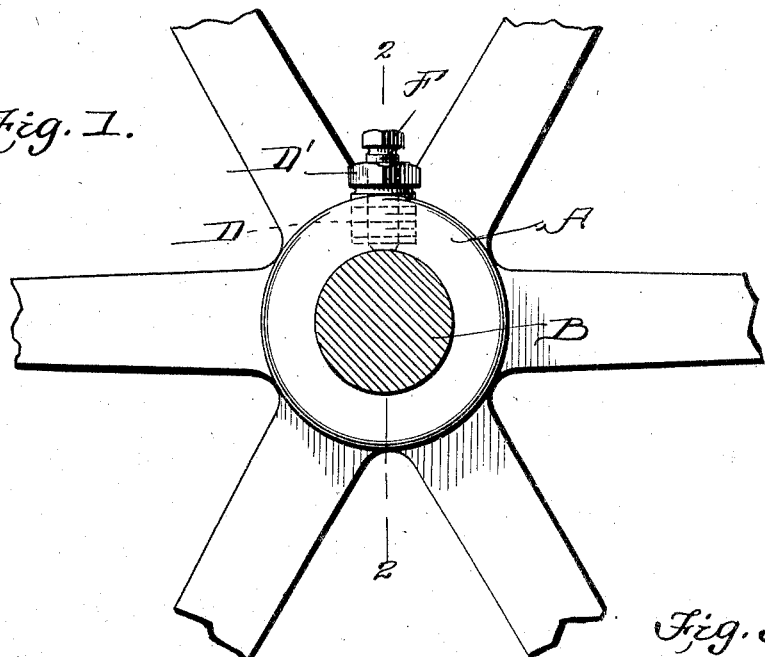
Figure 2:
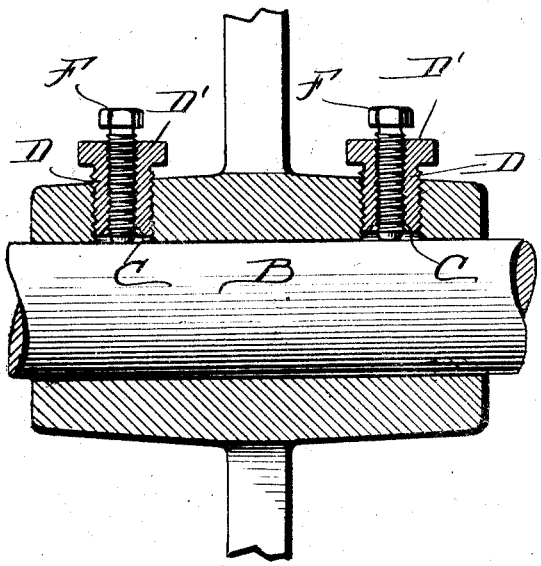
Figure 3:
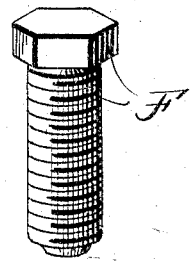
Figure 4:
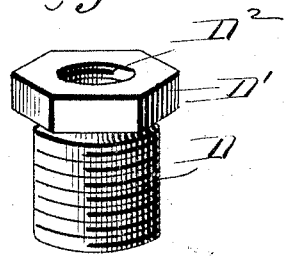

In the drawings forming a part of this specification:—Figure 1 is a side view of the wheel or pulley showing my improved set screw in place. Fig. 2 is a sectional view of the hub and set screw, the shaft being shown in elevation. Fig. 3 is a perspective view of the screw removed. Fig. 4 is a perspective view of the screw carrying plug.

Referring to the drawing A indicates the hub of a wheel or pulley mounted on a shaft B. Threaded openings C, are formed in the hub in which are secured threaded plugs D, preferably made of some malleable material and provided with a hexagon head $D'$, and a threaded bore $D^2$, extending entirely through the same, surrounded by a circular recess on its end. A set screw F, of the ordinary construction is secured in the threaded bore $D^2$, of the plug D, and extends entirely through the same, and bears upon the shaft for the purpose of fastening the wheel or pulley thereon.

From the foregoing description it will be seen that if the set screw should become broken the plug D, can be easily removed and with it the broken set screw which can be easily and quickly removed from the plug and a new screw inserted thereby overcoming the difficulties now existing with set screws of this character.

Having thus fully described my invention, what I claim as new and desire to secure by Letters Patent is:—

In a device of the kind described, the combination with a hub mounted on an axle and having threaded openings adjacent each end, of plugs provided with hexagonal heads and being screw threaded for screwing into said openings and said plugs also having a longitudinal screw threaded bore extending therethrough and set screws having hexagonal heads, adapted to screw in said longitudinal bore and engage the axle as set forth.

CHAS. PHILIP BRISON.

Witnesses:
　GEO. WOELFLIN.
　ALFRED WALKER.